United States Patent
Chikatmarla et al.

(10) Patent No.: US 12,526,371 B2
(45) Date of Patent: Jan. 13, 2026

(54) INTERNATIONAL ROAMING SUPPORT FOR CS SESSIONS ON WIRELESS HOME NETWORK

(71) Applicants: Boost SubscriberCo L.L.C., Englewood, CO (US); DISH Network Technologies India Private Limited, Karnataka (IN)

(72) Inventors: Jaya Chandra Chikatmarla, Highlands Ranch, CO (US); Sruthi Nair, Aurora, CO (US); Xiangang Dai, Littleton, CO (US); Kumar Anshuman, Bengaluru (IN); Dawood Shahdad, Aurora, CO (US)

(73) Assignees: Boost SubscriberCo L.L.C., Englewood, CO (US); DISH Network Technologies India Private Limited (IN)

( * ) Notice: Subject to any disclaimer, the term of this patent is extended or adjusted under 35 U.S.C. 154(b) by 256 days.

(21) Appl. No.: 18/243,300

(22) Filed: Sep. 7, 2023

(65) Prior Publication Data

US 2025/0088594 A1    Mar. 13, 2025

(51) Int. Cl.
*H04M 15/00*    (2024.01)
*H04W 4/24*    (2018.01)
*H04W 80/12*    (2009.01)

(52) U.S. Cl.
CPC ......... *H04M 15/8038* (2013.01); *H04W 4/24* (2013.01); *H04W 80/12* (2013.01)

(58) Field of Classification Search
CPC .... H04M 15/8038; H04W 4/24; H04W 80/12
USPC .......................................................... 455/408
See application file for complete search history.

(56) References Cited

U.S. PATENT DOCUMENTS

| | | | | |
|---|---|---|---|---|
| 8,295,832 B2* | 10/2012 | Adamany | ............... | H04W 8/10 |
| | | | | 455/433 |
| 2005/0141552 A1* | 6/2005 | Schwalb | ............. | H04Q 3/0045 |
| | | | | 370/466 |
| 2015/0304836 A1* | 10/2015 | Anslot | .................... | H04W 4/70 |
| | | | | 455/433 |

* cited by examiner

*Primary Examiner* — Huy C Ho
(74) *Attorney, Agent, or Firm* — Jeremiah J. Baunach; Frontier IP Law PLLC

(57) ABSTRACT

According to various embodiments, systems and methods disclosed herein can extract an actual address of a visitor location register (VLR) and an actual address of a mobile switching center (MSC) from signaling messages from a circuit-switched (CS) network in a foreign country and forward the actual addresses to a wireless network (e.g., a 5G network) whose subscriber is roaming in the foreign country through the CS network. The wireless network can use the actual address to determine the identity of the roaming country and the identity of the CS network so that the wireless network can exercise roaming control (e.g., authorizing or rejecting roaming calls) and billing users of the roaming subscribers based on which countries they are roaming in.

20 Claims, 7 Drawing Sheets

Table 1 – ANSI SS7 Translation Type (TT) code value known assignments:
Use of the following TT values are recommended (although the use of other values is not prohibited).

| Value | Application | Source | Notes |
|---|---|---|---|
| 0 | reserved | T1.112.3-2001 annex A, table A | |
| 1 | Identification Cards | T1.112.3-2001 annex A, table A | |
| 2 | reserved | T1.112.3-2001 annex A, table A | 1 |
| 3 | Cellular Nationwide Roaming Service | T1.112.3-2001 annex A, table A | |
| 3 | OTA Provisioning Function and (future) IS41 Roaming | Unknown - field assigned | |
| 4 | Global Title = Point Code | T1.112.3-2001 annex A, table A | |
| 5 | Calling Name Delivery | T1.112.3-2001 annex A, table A | |
| 6 | reserved | T1.112.3-2001 annex A, table A | 1 |
| 7 | Message Waiting | T1.112.3-2001 annex A, table A | |
| 8 | SCP Assisted Call Processing | T1.112.3-2001 annex A, table A | 2 |
| 8 | Proprietary assignment | Verizon Wireless field assigned | a |
| 9 | National and International Cellular/PCS Roaming | T1.112.3-2001 annex A, table A | |
| 10 | Network Entity Addressing | T1.112.3-2001 annex A, table A | |

FIG. 4

INTERNATIONAL ROAMING SUPPORT FOR CS SESSIONS ON WIRELESS HOME NETWORK

TECHNICAL FIELD

The present disclosure relates generally to cellular telecommunication networks and, more particularly, to controlling roaming subscription and roaming billing differentiation by country.

BRIEF SUMMARY

International mobile roaming is a service that allows mobile users to continue to use their mobile phone or other mobile device, while visiting another country.

For a subscriber (e.g., a smart phone) of a standalone (SA) 5G network, roaming in a foreign country with Legacy 2G/3G networks may pose challenges due to the fundamental differences in network technologies. Legacy 2G/3G networks use circuit-switched (CS) technology, while 5G operates on a packet-switched architecture. When a subscriber roams from a 2G/3G legacy network in a foreign country to a home 5G network, issues can arise in terms of service compatibility, signaling protocols, roaming control, and roaming charges.

For example, in the above roaming scenario, the Signaling System 7 (SS7) signaling protocol may be used, where global title (GT) used to indicate the roaming country is an alias for address that needs to be translated. The alias address may prevent the home network from accurately and reliably obtaining the identity of the foreign country (i.e., roaming country). Without the identity of the roaming country, the home network from would not be able to exercise roaming control and billing differentiation based on roaming countries.

According to various embodiments, systems and methods disclosed herein can extract an actual address of a visitor location register (VLR) and an actual address of a mobile switching center (MSC) from signaling messages from a circuit-switched (CS) network in a foreign country and forward the actual addresses to a 5G home network whose subscriber is roaming in the foreign country through the CS network. The 5G home network can use the actual address to determine the identity of the roaming country and the identity of the CS network so that the 5G home network can exercise roaming control (e.g., authorizing or rejecting roaming calls) and billing users of the roaming subscribers based on which countries they are roaming in.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 4 is an example of a translation type table that the operator of the 5G network provides to the signaling gateway 101 for each foreign roaming partner according to an embodiment of the invention.

DETAILED DESCRIPTION

The following description, along with the accompanying drawings, sets forth certain specific details in order to provide a thorough understanding of various disclosed embodiments. However, one skilled in the relevant art will recognize that the disclosed embodiments can be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments can be methods, systems, media, or devices. Accordingly, the various embodiments can be entirely hardware embodiments, entirely software embodiments, or embodiments combining software and hardware aspects.

Figure 1:
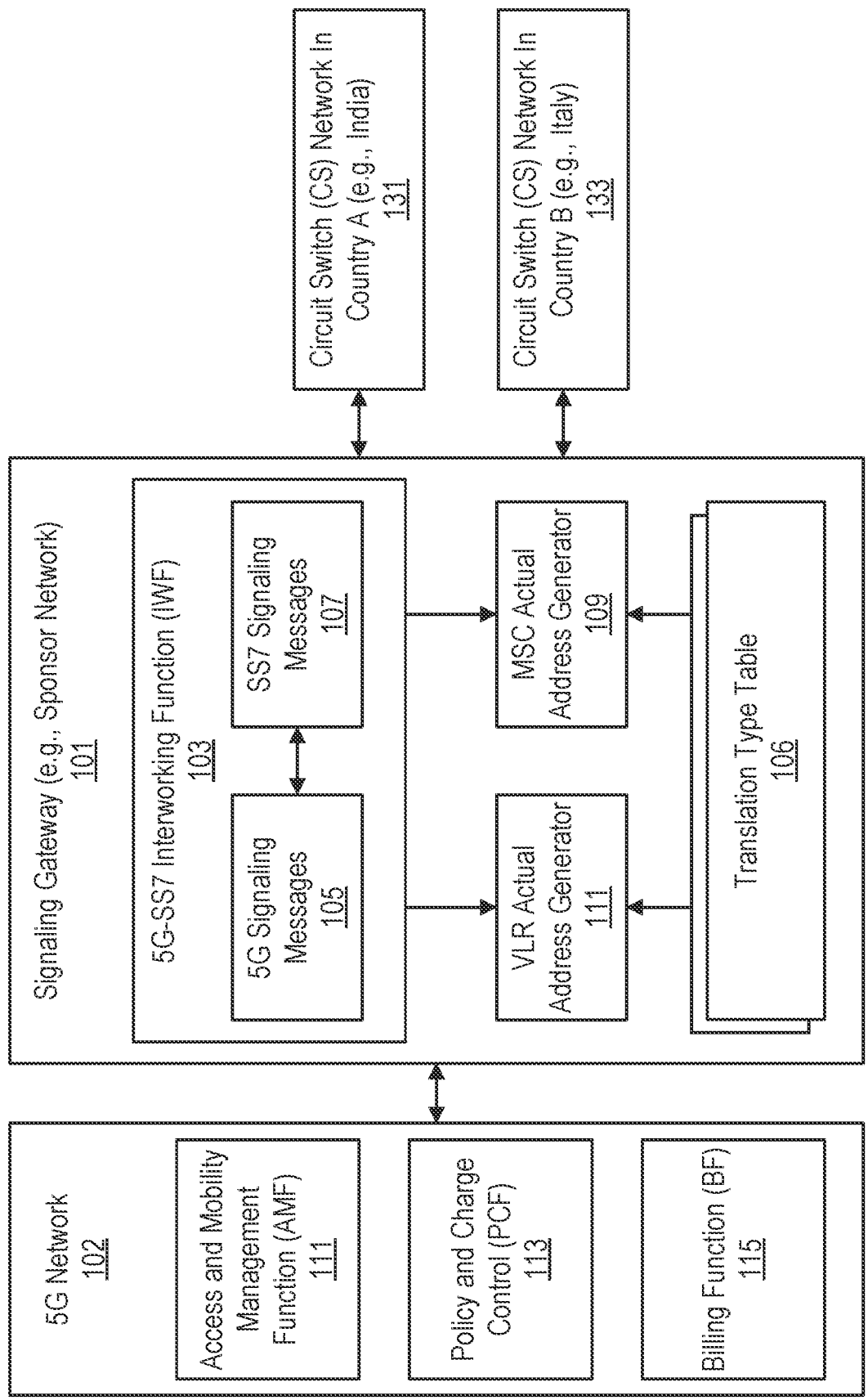
FIG. 1 is a block diagram illustrating an example signaling gateway for roaming control and billing differentiation in a 5G home network for subscribers roaming to CS networks in foreign countries according to an embodiment of the invention.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references. FIG. 1 is a block diagram illustrating an example signaling gateway 101 for roaming control and billing differentiation in a 5G home network 102 for subscribers roaming to CS networks in foreign countries according to an embodiment of the invention.

In some embodiments, the signaling gateway 101 can be owned and operated by the operator of the 5G network 102. In some embodiment, the signaling gateway 101 can run on a sponsor network that has an agreement with the 5G network to provide roaming services to the subscribers of the 5G network. The sponsor network can be a one-stop shop that allows the 5G network 102 to broaden international coverage without having to expand its roaming offering by negotiating one agreement at a time with each foreign roaming partner. Instead, the operator of the 5G network can negotiate one roaming agreement with the sponsor network that has existing international roaming coverage that the 5G network 102 can piggyback on. In some embodiments, the operator of the 5G network 102 can separately negotiate a roaming agreement with each foreign roaming partner and negotiate a sponsoring agreement with the sponsor network. A roaming agreement can define the terms of service and specifies the details of the relationship, including billing rates, data limits, and quality of service (QOS) parameters. A roaming agreement can further define authentication and authorization, routing and session setup, billing and charging, and policy control.

Regardless of whether the signaling gateway 101 is provided by a sponsor network or owned by the operator of the 5G network 102, the signaling gateway 102 can be a virtual signaling gateway that is implemented as a software application deployed on-premises or in the cloud.

The signaling gateway 101 can include a 5G-SS7 inter-working function (IWF) 103, which handles the translation between 5G signaling messages 105 and SS7 signaling messages 107. The 5G signaling messages 105 can be encapsulated in signaling protocols used in the 5G network 102, e.g., Diameter or HTTP/2, while the SS7 messages can be encapsulated in signaling protocols in legacy network, e.g., SS7. The 5G-SS7 IWF 103 can be responsible for interfacing between the circuit-switched (CS) networks 131 and 133 and the 5G network 102. When the 5G-SS7 IWF 103 receives an SS7 signaling message that originates from either the CS network 131 or the CS network 133 for call setup, the 5G-SS7 IWF 103 can interpret the content and meaning of the message, translate the message from the SS7 protocol to the appropriate protocol used in the 5G network 102. Then, data contained in the message, such as caller ID, destination number, and other relevant information, can be mapped or converted to the corresponding data format in the 5G network 102. After the data mapping, the SS7 message can be restructured or formatted according to the specific requirements of 5G signaling and data formats and routed to the 5G network 102.

In some embodiments, data messages may also need to be converted between the 5G network 102 and each of the CS networks 131 and 133, for example, when the CS network uses a different encryption scheme than the 5G network. In this example, the data messages need to be translated so that they can be decrypted and re-encrypted.

In some embodiments, the 5G-SS7 IWF 103, while parsing a SS7 signaling message for protocol conversion, can extract the global tile of the VLR and the global title of the MSC from the MAP layer and/or the SCCP layer of the SS7 signaling message. The signaling gateway can translate the global title of the VLR using a VLR actual address generator 111 and translate the global title of the MSC using an MSC actual address generator 109 using data from a translation type table 106. The 5G network 102 can provide a translation type table to the signaling gateway 101 for each foreign country that has a CS partner network (i.e., roaming partner) that has a roaming agreement with the 5G network 102. Therefore, the 5G network 102 can have a translation type table for the CS network in country A 131, and another translation type table for the CS network in country B. The translation type table 106 is selected based on a country code in either the global title of the VLR or the global title of the MSC, and both global titles can include the same country code. In this disclosure, the country code is not used to determine the foreign country where the roaming call originates since a global title is an alias and not a reliable source that can be used to accurately and consistently determined the foreign roaming country.

In some embodiments, each translation type table can include translation types for a plurality of services and applications used in roaming calls between the 5G network and a roaming partner. A translation type can be a code used to indicate how a global title should be translated.

In some embodiments, the translation type table 106 includes a translation type for translating the global title of the VLR and the global title of the MSC. In some embodiments, the two global titles can have the same translation type, which indicates that each global title should be translated to a point code. The point code for the VLR can be a unique identifier of the VLR in an SS7 network, and the point code for the MSC is a unique identifier of the MSC in an SS7 network. Therefore, each point code can be considered an actual address because, unlike a global title which is an alias, the underlying network entity corresponding to the point code will not change.

The point code of the VLR and the point code of the MSC can be sent to the 5G network 102 along in a 5G signaling message that has been converted from an SS7 singling message. The 5G network 102 can determine the roaming country based on the point code of the VLR and the point code of MSC and use the roaming country to perform roaming control and roaming billing.

In some embodiments, an access and mobility management function (AMF) 111 can be used to determine the roaming country of a roaming call and the roaming partner associated with an international roaming call based on the point code of the VLR and the point code of the MSC, and further determine whether to authorize the call after consulting with a policy and charge control function (PCF) 113. A billing function (BF) 115 in the 5G network 102 can be used to bill the roaming subscriber properly based on the determined roaming country and the roaming partner.

Figure 2:
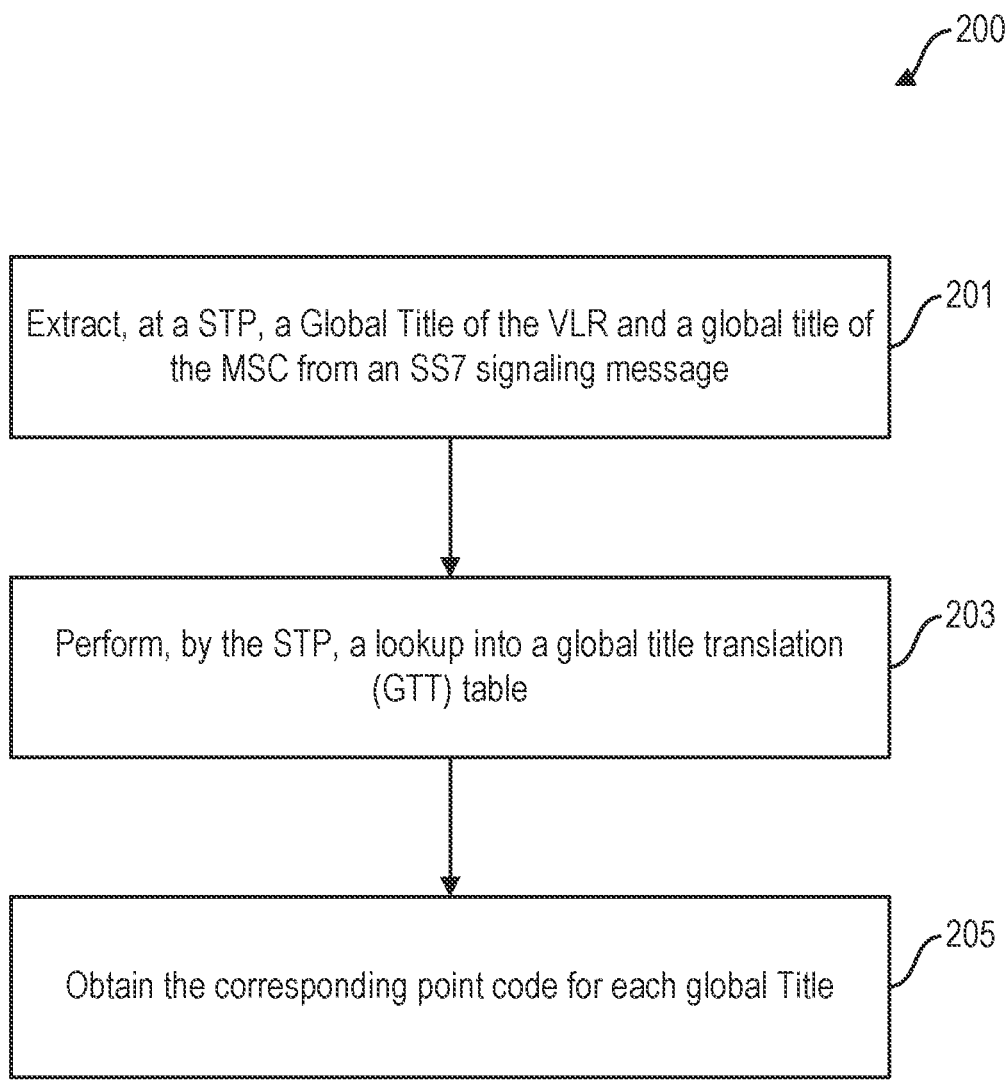
FIG. 2 is a flow diagram illustrating a process of translating a global title into a point code according to an embodiment of the invention.

FIG. 2 is a flow diagram illustrating a process 200 of translating a global title into a point code according to an embodiment of the invention. The process 200 can be used to translate a global title of the VLR and a global title of the MSC in an SS7 signaling message. The process 200 can be performed by software, hardware, or a combination therewith. For example, the process 200 can be performed by a signaling transfer point (STP) in a CS network. The signaling gateway 101 can be such an STP.

At step 201, the STP extracts the global title of the VLR and the global title of the MSC from the SCCP layer of the SS7 signaling message. In some implementations, the global title of the MSC can also be extracted from the MAP layer. In some embodiments, the global title of the VLR and the global title of the MSC can be extracted from the Calling Party Number (CPN) of the SCCP layer of the SS7 signaling message. Similarly, the global title of the MSC can be extracted from the CPN of the MAP layer of the SS7 signaling message.

At step 203, the STP checks its global title translation (GTT) database to translate the global title of the VLR and the global title of the MSC into their corresponding point codes. In some embodiments, this GTT database can contain mapping rules that determine how to convert a global title to a point code. The mapping rules can be based on several factors, such as the global title's structure, the numbering plan used, and specific prefixes or suffixes in the global title.

At step 205, the STP can obtain the point code of the VLR and the point code of the MSC and send them to the 5G network. The point code of the VLR is the actual address of the VLR, and the point code of the MSC is the actual address of the MSC.

Figure 3:
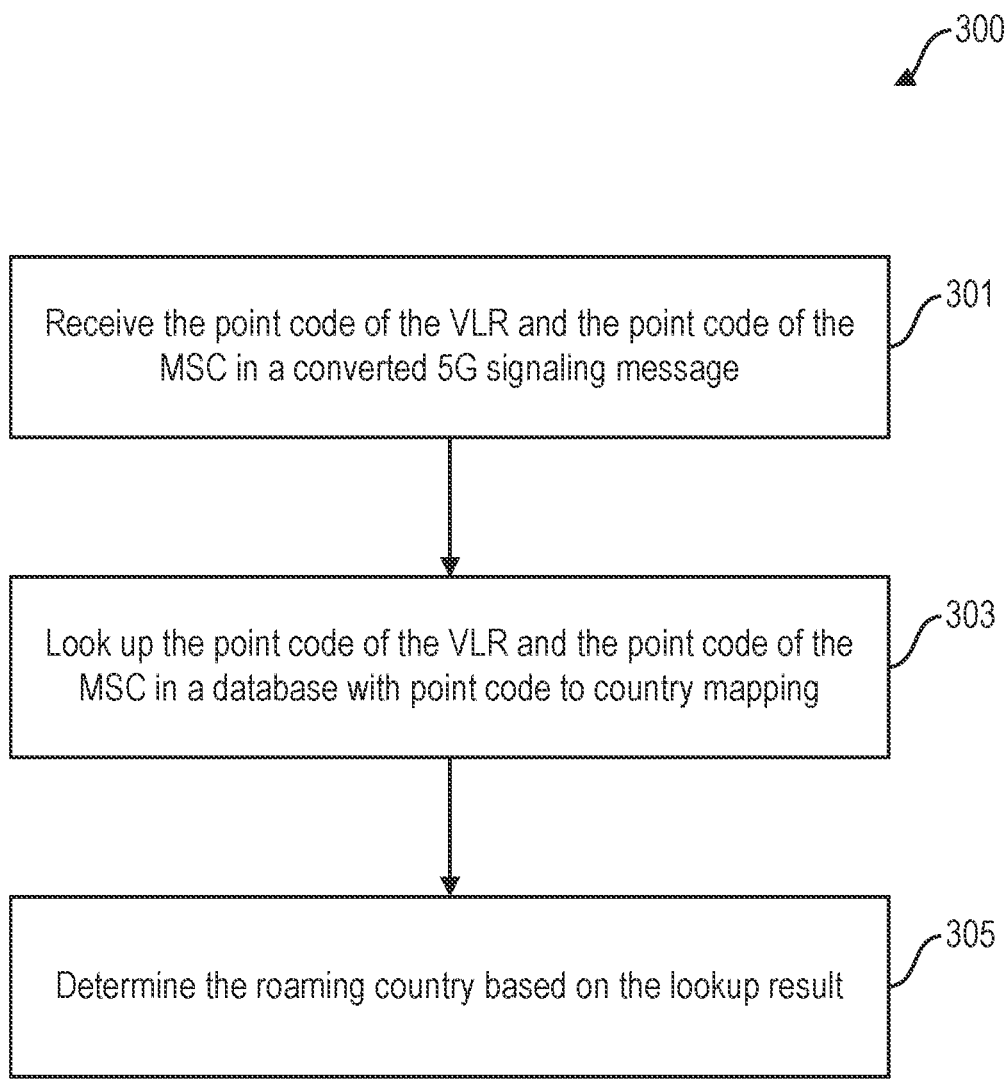
FIG. 3 is a flow diagram illustrating a process of determining a roaming country where an international roaming call originates according to an embodiment of the invention.

FIG. 3 is a flow diagram illustrating a process 300 of determining a roaming country where an international roaming call originates according to an embodiment of the invention. The process 200 can be performed by software, hardware, or a combination therewith. For example, the process 300 can be performed by the AMF in a 5G network, such as the 5G network 102.

At step 301, the AMF receives the point code of the VLR and the point code of the MSC from the signaling gateway 101 in a signaling message implemented in a 5G protocol (referred to as a 5G signaling message). The 5G signaling message is converted by the signaling gateway 101 from an SS7 signaling message.

At step 303, the AMF looks up the point code of the VLR and the point code of the MSC in a database that contains mappings between point codes and countries. The database can be maintained by the Global System for Mobile communication (GSM) association and can be updated on a regular basis. The database can be used by mobile operators to determine the roaming country of a subscriber when they are roaming in a foreign network, and is available in a variety of formats, including XML, JSON, and CSV.

For example, if the point code of the VLR is 1234 and the point code of the MSC is 5678, then the roaming country would be India, because the database contains the following mapping entry:

| Point Code | VLR | MSC | Country |
|---|---|---|---|
| 1234 | Mumbai | 5678 | India |

At step 305, the AMF determines the foreign country where the subscriber of the 5G network is currently roaming. Combining the code of the VLR and the point Code of the MSC enables the AMF to identify the foreign country where the subscriber is currently roaming as well as the visited network.

The combination of the VLR point code and the MSC point code allows the 5G network to determine the foreign country more accurately. The global title of an MSC is used to route SS7 signaling messages to the correct network. On the other hand, the global title of a VLR is used for mobility management functions, such as tracking and paging a mobile device when a call is incoming. The identification of both the MSC and the VLR provide information about the call and the user's current location, and therefore both are included in SS7 signaling messages. However, a country might have multiple MSCs within different regions or areas, each with its own unique point code. So the combination of both point codes enables the 5G network 102 to pinpoint the exact location of the subscriber and ensure that the appropriate roaming policies, services, and billing rates are applied accordingly.

FIG. 4 is an example of a translation type table 400 that the operator of the 5G network 102 provides to the signaling gateway 102 for each foreign roaming partner according to an embodiment of the invention. The translation type table 400 can be considered an example of the translation type table 106 illustrated in FIG. 1. By way of background, global titles can be applied in many different scenarios in an international roaming call. The column "Application 404" describes some of these scenarios. The table also includes a column "Value 402", which lists the corresponding translation type for each scenario. Each value can indicate a translation type that has been agreed upon between the operator of the 5G network 102 and a foreign roaming partner and can be used to specify how the global title can be interpreted and handled.

This disclosure describes the scenarios for Identification Cards 401, Global Title 403, and Calling Name Delivery 405 as examples, and other scenarios are not described herein, but a person of ordinary skill in the art would appreciate the meaning of their corresponding translation types.

International roaming calls can be charged using cards issued by service providers or by banks and other types of financial institutions. The caller may be required to enter a PIN number when making the call so that an application can validate the card through a database application. This type of application is defined as the Identification Card Application Group 401 and has assigned to the Translation Type byte the value of "1". Based on the agreement between the 5G network and the corresponding foreign roaming partner (i.e., between their respective operators), the value of "1" can define a particular manner of interpretation signaling messages related to identification cards. For example, the global tile of a signaling message for identification cards can include the subscriber's identification card number, the recipient's phone number, and other information. The translation type of "1", as agreed upon between the 5G network and the foreign roaming partner, can indicate to the signaling node (e.g., the signaling gateway 101) how to interpret the global title in a signaling message, for example, whether or not to charge the subscriber for the call.

The "Global Title 403" used herein refers to the global title in the SCCP layer and the MAP layer, and the translation type "4", as agreed upon between the 5G home network and the foreign roaming partner, indicates how to translate the global title in each of the SCCP layer and the MAP layer. As shown in the example table 400, the global title in each layer should be translated to a corresponding point code.

The "Calling Name Delivery" 405 is a feature that allows the caller's name to be displayed on the recipient's phone when they receive a call. As shown, this feature/scenario has a translation type "5", which may indicate, based on a roaming agreement, that the signaling node (e.g., the signaling gateway 101) in an SS7 network will not display the caller's name if the recipient's phone is configured to block anonymous calls, It is worth noting that the above translation types can have different values for each application (use scenario) for each foreign roaming partner based on the roaming agreement. The 5G network may provide such a translation type table for each foreign roaming partner to the signaling gateway 102 so that the signaling gateway 102 can properly translate each signaling message from the foreign roaming partner.

Figure 5:
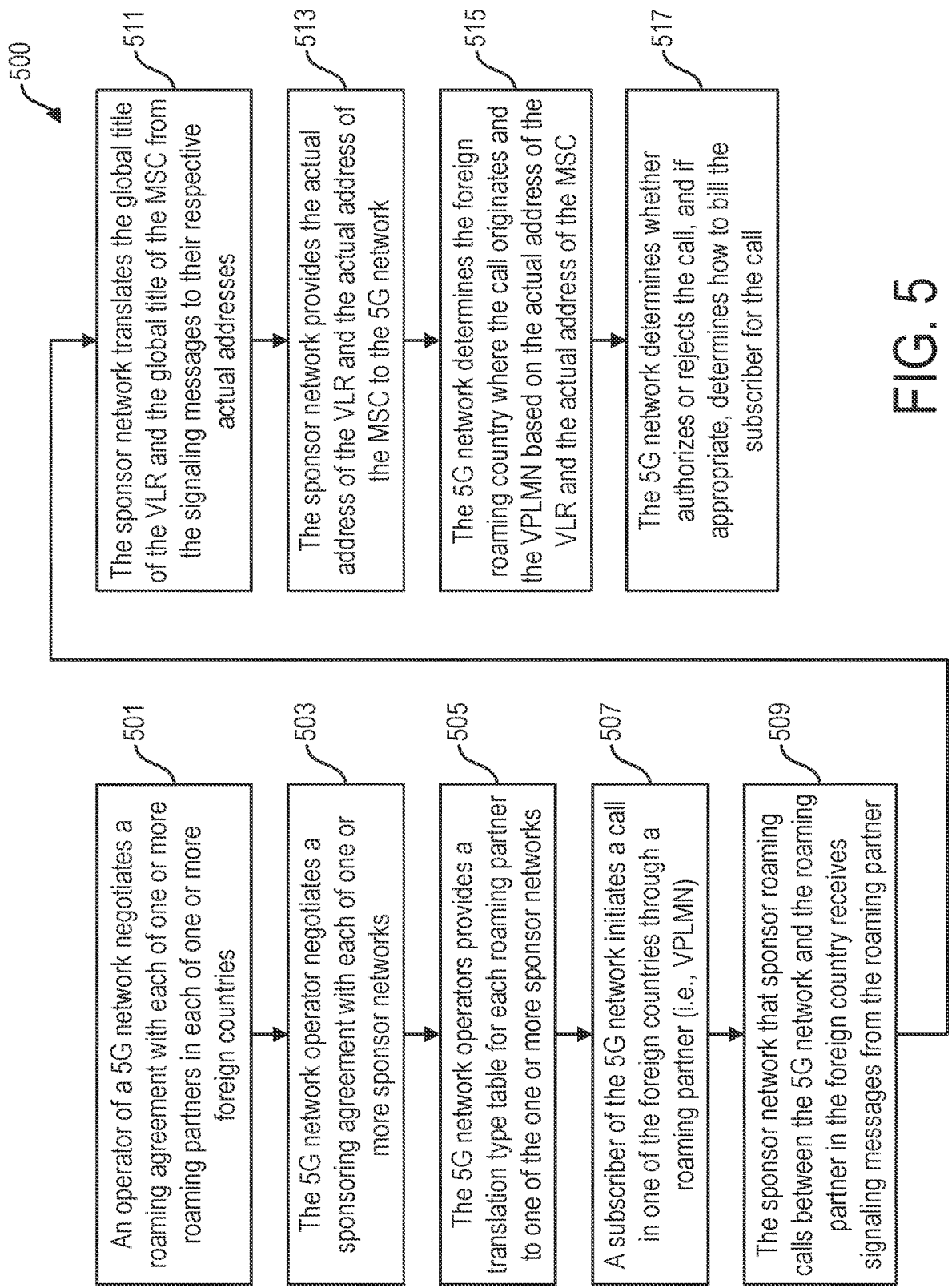
FIG. 5 is a flow diagram illustrating a process of exercising roaming control and roaming billing differentiation by country according to an embodiment of the invention.

FIG. 5 is a flow diagram illustrating a process 500 of exercising roaming control and billing differentiation by country according to an embodiment of the invention.

At step 501, An operator of a 5G network negotiates a roaming agreement with each of one or more roaming partners in each of one or more foreign countries. The roaming agreement can involve billing rates for international roaming calls, and details regarding signaling message translation, such as translation types. In some embodiments, the 5G network may have more than roaming partners in a foreign country and have such a roaming agreement with each roaming partner in the foreign country.

At 503, the 5G network operator negotiates a sponsoring agreement with each of one or more sponsor networks. A sponsor network can be an established network that already has international roaming coverage in one or more countries through its partner networks.

At step 505, the 5G network operator provides a translation type table for each roaming partner to a sponsor network. Since a single sponsor network may not have partners in each country, the 5G network may need to negotiate a sponsoring agreement with more than one sponsor network to enable international roaming in more countries.

At step 507, a subscriber of the 5G network initiates a call in one of the foreign countries through a roaming partner (i.e., VPLMN).

At step 509, the sponsor network that sponsors roaming calls between the 5G network and the roaming partner in the foreign country receives signaling messages from the roaming partner, and coverts the signaling messages implemented in SS7 signaling protocol to signaling messages implemented in a 5G signaling protocol.

At step 511, the sponsor network translates the global title of the VLR and the global title of the MSC from the signaling messages to their respective actual addresses. To do that, the sponsor network extracts the global title of the VLR and the global title of the MSC from the SCCP layer and/or the MAP layer of the signaling messages and translate the global titles into their corresponding point codes. The point code of the VLR is the actual address of the VLR and the point code of the MSC is the actual address of the MSC.

At step 513, the sponsor network provides the actual address of the VLR and the actual address of the MSC to the 5G network.

At step 515, the 5G network determines the foreign roaming country where the call originates and the VPLMN based on the actual address of the VLR and the actual address of the MSC. The use of both the point code of the VLR and the point code of the MSC allows the 5G network to accurately determine the roaming country where the call originates and to pinpoint the specific VPLMN if there are more than one roaming partners in that roaming country.

Figure 6:
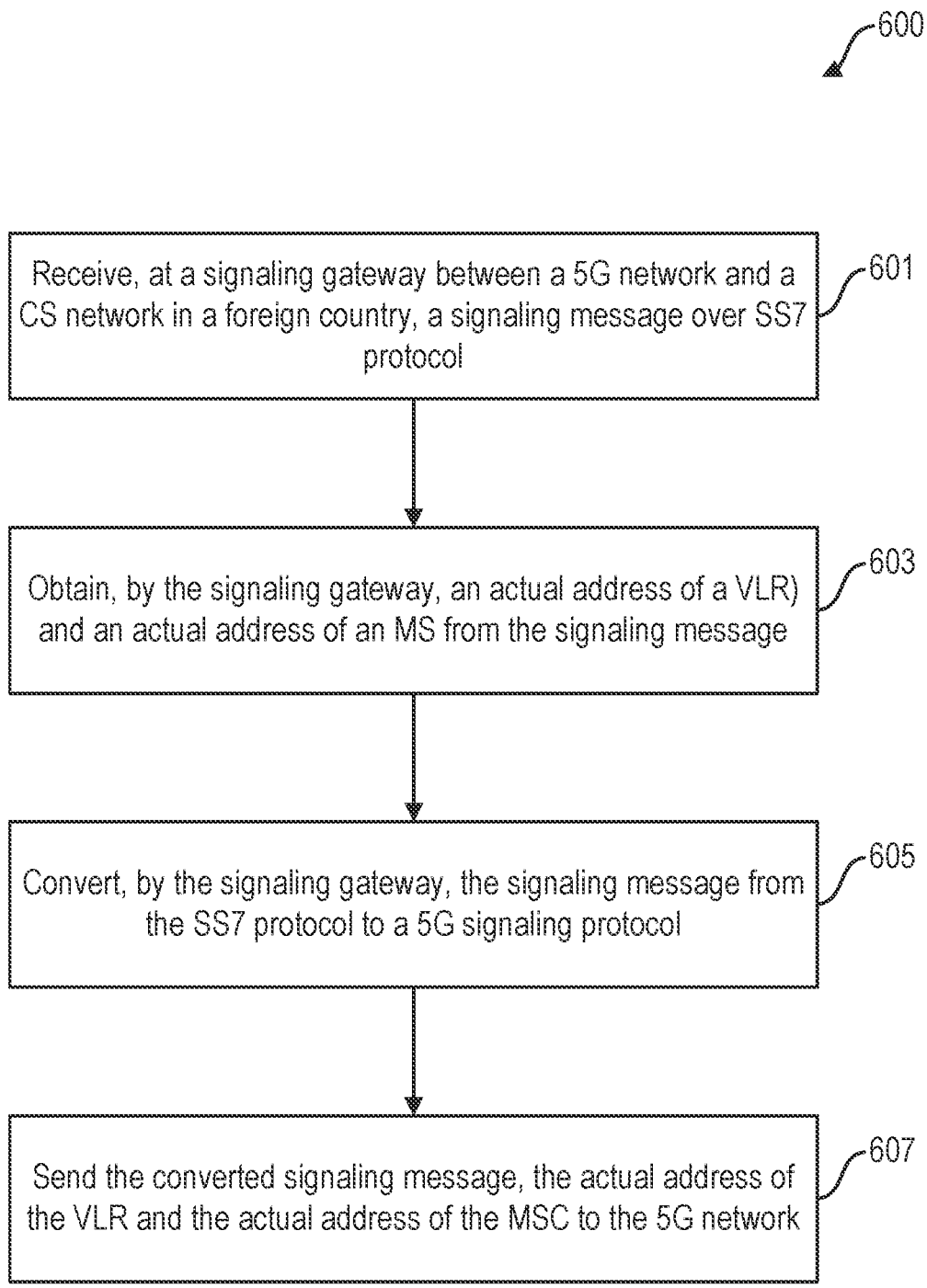
FIG. 6 is a flow diagram illustrating a process of international roaming control and roaming billing differentiation by country according to an embodiment of the invention.

At step 517, the 5G network determines whether to authorize or reject the call, and if appropriate, determines how to bill the subscriber for the call. The AMF of the 5G network can consult with the PCF function to determine whether to authorize or reject the call based on the foreign country where the call originates. For example, if the subscriber of the 5G network is only allowed to roam in India based on the subscription plan, then a roaming call from the subscriber in Mexico would be rejected. Further, with the roaming country and the specific roaming partner determined, the 5G network would be able to bill the roaming subscriber based on the roaming country and the VPLMN FIG. 6 is a flow diagram illustrating a process 600 of international roaming control and roaming billing differentiation by country according to an embodiment of the invention.

At step 601, the signaling gateway between a 5G network and a CS network in a foreign country receives a signaling message over an SS7 protocol.

At step 603, the signaling gateway obtains an actual address of a visitor location register (VLR) and an actual address of a mobile switching center (MSC) from the signaling message.

At step 605, the signaling gateway converts the signaling message from the SS7 protocol to a 5G signaling protocol.

At step 607, the signaling gateway sends the converted signaling message, the actual address of the VLR and the actual address of the MSC to the 5G network.

Figure 7:
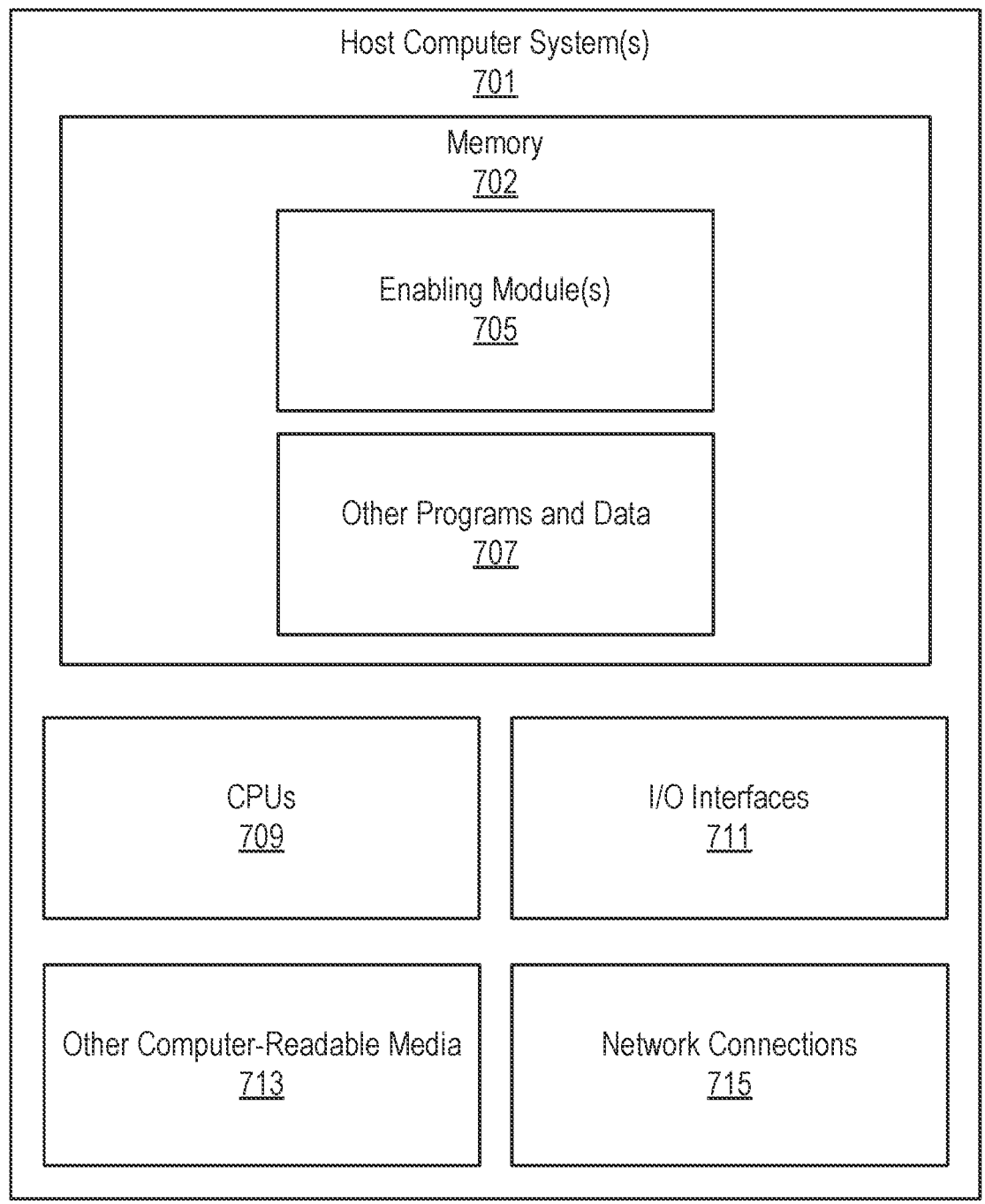
FIG. 7 shows a system diagram that describes an example implementation of a computing system(s) for implementing embodiments described herein.

FIG. 7 shows a system diagram that describes an example implementation of a computing system(s) for implementing embodiments described herein.

The functionality described herein for international roaming support for CS sessions on a home network over 5G standalone public cloud can be implemented either on dedicated hardware, as a software instance running on dedicated hardware, or as a virtualized function instantiated on an appropriate platform, e.g., a cloud infrastructure. In some embodiments, such functionality can be completely software-based and designed as cloud-native, meaning that they are agnostic to the underlying cloud infrastructure, allowing higher deployment agility and flexibility. However, FIG. 7 illustrates an example of underlying hardware on which such software and functionality can be hosted and/or implemented.

In this embodiment, an example host computer system(s) 701 is used to represent one or more of those in various data centers, base stations and cell sites shown and/or described herein that are, or that host or implement the functions of: routers, components, microservices, nodes, node groups, control planes, clusters, virtual machines, network functions (NFs), intelligence layers, orchestrators and/or other aspects described herein, as applicable, for international roaming support for CS sessions on a home network over 5G standalone public cloud. In some embodiments, one or more special-purpose computing systems can be used to implement the functionality described herein. Accordingly, various embodiments described herein can be implemented in software, hardware, firmware, or in some combination thereof. Host computer system(s) 701 can include memory 702, one or more central processing units (CPUs) 709, I/O interfaces 711, other computer-readable media 713, and network connections 715.

Memory 702 can include one or more various types of non-volatile (non-transitory) and/or volatile (transitory) storage technologies. Examples of memory 702 can include, but are not limited to, flash memory, hard disk drives, optical drives, solid-state drives, various types of random-access memory (RAM), various types of read-only memory (ROM), neural networks, other computer-readable storage media (also referred to as processor-readable storage media), or the like, or any combination thereof. Memory 702 can be utilized to store information, including computer-readable instructions that are utilized by CPU 709 to perform actions, including those of embodiments described herein.

Memory 702 can have stored thereon enabling module(s) 705 that can be configured to implement and/or perform some or all of the functions of the systems, components and modules described herein for international roaming support for CS sessions on a home network over 5G standalone public cloud. Memory 702 can also store other programs and data 707, which can include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, intelligence layer software, network functions (NF), artificial intelligence (AI) or machine learning (ML) programs or models to perform the functionality described herein, user interfaces, operating systems, other network management functions, other NFs, etc.

Network connections 715 are configured to communicate with other computing devices to facilitate the functionality described herein. In various embodiments, the network connections 715 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 711 can include video interfaces, other data input or output interfaces, or the like. Other computer-readable media 713 can include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A method of international roaming control and billing differentiation by country, comprising:
   receiving, at a signaling gateway between a wireless network and a circuit-switched (CS) network in a foreign country, a signaling message over a Signaling System 7 (SS7) protocol from the CS network;
   obtaining, by the signaling gateway, an actual address of a visitor location register (VLR) and an actual address of a mobile switching center (MSC) from the signaling message;
   converting, by the signaling gateway, the signaling message from the SS7 protocol to a wireless signaling protocol; and
   sending the converted signaling message, the actual address of the VLR and the actual address of the MSC to the wireless network.

2. The method of claim 1, wherein the obtaining of the actual VLR address and the actual MSC address comprises:
   extracting a global title of the VLR from a signaling connection control part (SCCP) layer of the SS7 protocol, and a global title of the MSC from a mobile application part (MAP) layer of the SS7 protocol; and
   translating the global title of the VLR to a first point code representing the actual address of the VLR and the Global title of the MSC to a second point code representing the actual address of the MSC.

3. The method of claim 2, wherein the signaling gateway sends the actual address of the VLR and the actual address of the MSC to the wireless network for use in authorizing or rejecting the signaling message based on whether a roaming subscriber that sends the signaling message is allowed to roam in the foreign country.

4. The method of claim 2, wherein the signaling gateway sends the actual VLR address and the actual MSC address to the wireless network for billing a roaming subscriber that initiates the signaling message based on a roaming agreement between operators of the wireless network and the CS network in the foreign country.

5. The method of claim 1, wherein the CS network is one of public switched telephone network (PSTN), an integrated services digital network (ISDN), a second generation (2G) mobile network, a third generation (3G) mobile network, and a private branch exchange (PBX) system.

6. The method of claim 1, wherein the wireless network is a stand-alone (SA) and cloud-native 5G network.

7. The method of claim 1, wherein the signaling gateway is a third-party sponsor network whose operator has a sponsoring agreement with an operator of the wireless network, or a network that is controlled and operated by the operator of the wireless network.

8. The method of claim 7, wherein the signaling gateway includes a translation type table for each of a plurality of roaming partners that each have a roaming agreement with the operator of the wireless network, wherein the translation type table for each roaming partner includes translation types for a plurality of services and applications used in roaming calls between the wireless network and the roaming partner.

9. The method of claim 8, wherein the translation type table includes a translation type for translating a global title of the VLR and a global title of the MSC.

10. A non-transitory computer-readable storage medium having computer-executable instructions stored thereon for international roaming control and billing differentiation by country, wherein the computer-executable instructions, when executed by one or more processors of a signaling gateway between a wireless network and a circuit-switched (CS) network in a foreign country, cause the signaling gateway to perform operations comprising:
    receiving a signaling message over a Signaling System 7 (SS7) protocol from the CS network;
    obtaining an actual address of a visitor location register (VLR) and an actual address of a mobile switching center (MSC) from the signaling message;
    converting the signaling message from the SS7 protocol to a wireless signaling protocol; and
    sending the converted signaling message, the actual address of the VLR and the actual address of the MSC to the wireless network.

11. The non-transitory computer-readable storage medium of claim 10, wherein the obtaining of the actual VLR address and the actual MSC address comprises:
    extracting a global title of the VLR from a signaling connection control part (SCCP) layer of the SS7 protocol, and a global title of the MSC from a mobile application part (MAP) layer of the SS7 protocol; and
    translating the global title of the VLR to a first point code representing the actual address of the VLR and the Global title of the MSC to a second point code representing the actual address of the MSC.

12. The non-transitory computer-readable storage medium of claim 11, wherein the signaling gateway sends the actual address of the VLR and the actual address of the MSC to the wireless network for use in authorizing or rejecting the signaling message based on whether a roaming subscriber that sends the signaling message is allowed to roam in the foreign country.

13. The non-transitory computer-readable storage medium of claim 11, wherein the signaling gateway sends the actual VLR address and the actual MSC address to the wireless network for billing a roaming subscriber that initiates the signaling message based on a roaming agreement between operators of the wireless network and the CS network in the foreign country.

14. The non-transitory computer-readable storage medium of claim 10, wherein the CS network is one of public switched telephone network (PSTN), an integrated services digital network (ISDN), a second generation (2G) mobile network, a third generation (3G) mobile network, and a private branch exchange (PBX) system.

15. The non-transitory computer-readable storage medium of claim 10, wherein the wireless network is a stand-alone (SA) and cloud-native 5G network.

16. The non-transitory computer-readable storage medium of claim 10, wherein the signaling gateway is a third-party sponsor network whose operator has a sponsoring agreement with an operator of the wireless network, or a network that is controlled and operated by the operator of the wireless network.

17. The non-transitory computer-readable storage medium of claim 16, wherein the signaling gateway includes a translation type table for each of a plurality of roaming partners that each have a roaming agreement with the operator of the wireless network, wherein the translation type table for each roaming partner includes translation types for a plurality of services and applications used in roaming calls between the wireless network and the roaming partner.

18. The non-transitory computer-readable storage medium of claim 17, wherein the translation type table includes a translation type for translating a global title of the VLR and a global title of the MSC.

19. A system between a wireless network and a circuit-switched (CS) network in a foreign country, the system comprising:

one or more processors;
at least one memory coupled to the one or more processor and storing computer-executable instructions, which, when executed by the one or more processors, cause the system to perform operations comprising:
receiving a signaling message over a Signaling System 7 (SS7) protocol from the CS network;
obtaining an actual address of a visitor location register (VLR) and an actual address of a mobile switching center (MSC) from the signaling message;
converting the signaling message from the SS7 protocol to a wireless signaling protocol; and
sending the converted signaling message, the actual address of the VLR and the actual address of the MSC to the wireless network.

20. The system of claim 19, wherein the obtaining of the actual VLR address and the actual MSC address comprises:
extracting a global title of the VLR from a signaling connection control part (SCCP) layer of the SS7 protocol, and a global title of the MSC from a mobile application part (MAP) layer of the SS7 protocol; and
translating the global title of the VLR to a first point code representing the actual address of the VLR and the Global title of the MSC to a second point code representing the actual address of the MSC.

\* \* \* \* \*